ately mounted crank arm. A roller on one side of the crank arm pivot slides in a longitudinal track in one transfer bar to push that bar in and out. A slideable transverse rod pivotally connected to the crank arm on the other side of the pivot has a roller on a remote end which slides in a longitudinal track in the other of the transfer bars to push that transfer bar in and out. Carriages moveable along upwardly and outwardly slanted slide assemblies mounted on the transfer bars have rollers which engage bumpers upon inward movement of the transfer bars to push the carriages upwardly. Gripper fingers are connected to longitudinal support bars extending from the carriages.

United States Patent [19]
Boegner et al.

[11] Patent Number: 4,577,748
[45] Date of Patent: Mar. 25, 1986

[54] PRESS MOUNTED TRANSFER APPARATUS

[75] Inventors: Gregory J. Boegner, Baltimore; Harry J. Walters, Fallston; Robert L. Marshner, Timonium, all of Md.

[73] Assignee: M. S. Willett, Inc., Cockeysville, Md.

[21] Appl. No.: 431,418

[22] Filed: Sep. 30, 1982

[51] Int. Cl.⁴ ............................................. B65G 25/00
[52] U.S. Cl. ..................... 198/621; 198/774; 414/749; 414/751
[58] Field of Search ............ 198/621, 774; 414/749, 414/750, 751

[56] References Cited
U.S. PATENT DOCUMENTS

| | | | |
|---|---|---|---|
| 3,075,651 | 1/1963 | Kaden | 414/753 X |
| 3,262,541 | 7/1966 | De Gain | 198/621 |
| 3,655,070 | 4/1972 | Haydu | 198/621 X |
| 3,738,503 | 6/1973 | Wallis | 198/621 X |
| 3,746,184 | 7/1973 | Wallis | 414/751 X |
| 3,754,667 | 8/1973 | Storch | 414/751 X |
| 3,885,680 | 5/1975 | Rasenberger | 414/751 |
| 4,032,018 | 6/1977 | Wallis | 414/751 X |
| 4,198,845 | 4/1980 | Sofy | 198/621 X |
| 4,311,429 | 1/1982 | Wallis | 198/621 X |
| 4,359,153 | 11/1982 | Gerben et al. | 198/621 |
| 4,540,087 | 9/1985 | Mizumoto | 198/774 X |

Primary Examiner—Robert J. Spar
Assistant Examiner—Stuart J. Millman
Attorney, Agent, or Firm—James C. Wray

[57] ABSTRACT

A transfer apparatus has longitudinal, transverse and vertical movements. Transfer bars are mounted on a frame which moves longitudinally as a unit. The bars move transversely on the frame. A drive box mounted on a side of the frame has transverse and longitudinal drive levers. The longitudinal drive lever has a roller which slides in a transverse track in one of the transfer bars to drive the frame forward and rearward. The transverse drive lever is pivotally connected to a link which is pivotally connected to a pivotally mounted crank arm. A roller on one side of the crank arm pivot slides in a longitudinal track in one transfer bar to push that bar in and out. A slideable transverse rod pivotally connected to the crank arm on the other side of the pivot has a roller on a remote end which slides in a longitudinal track in the other of the transfer bars to push that transfer bar in and out. Carriages moveable along upwardly and outwardly slanted slide assemblies mounted on the transfer bars have rollers which engage bumpers upon inward movement of the transfer bars to push the carriages upwardly. Gripper fingers are connected to longitudinal support bars extending from the carriages.

23 Claims, 7 Drawing Figures

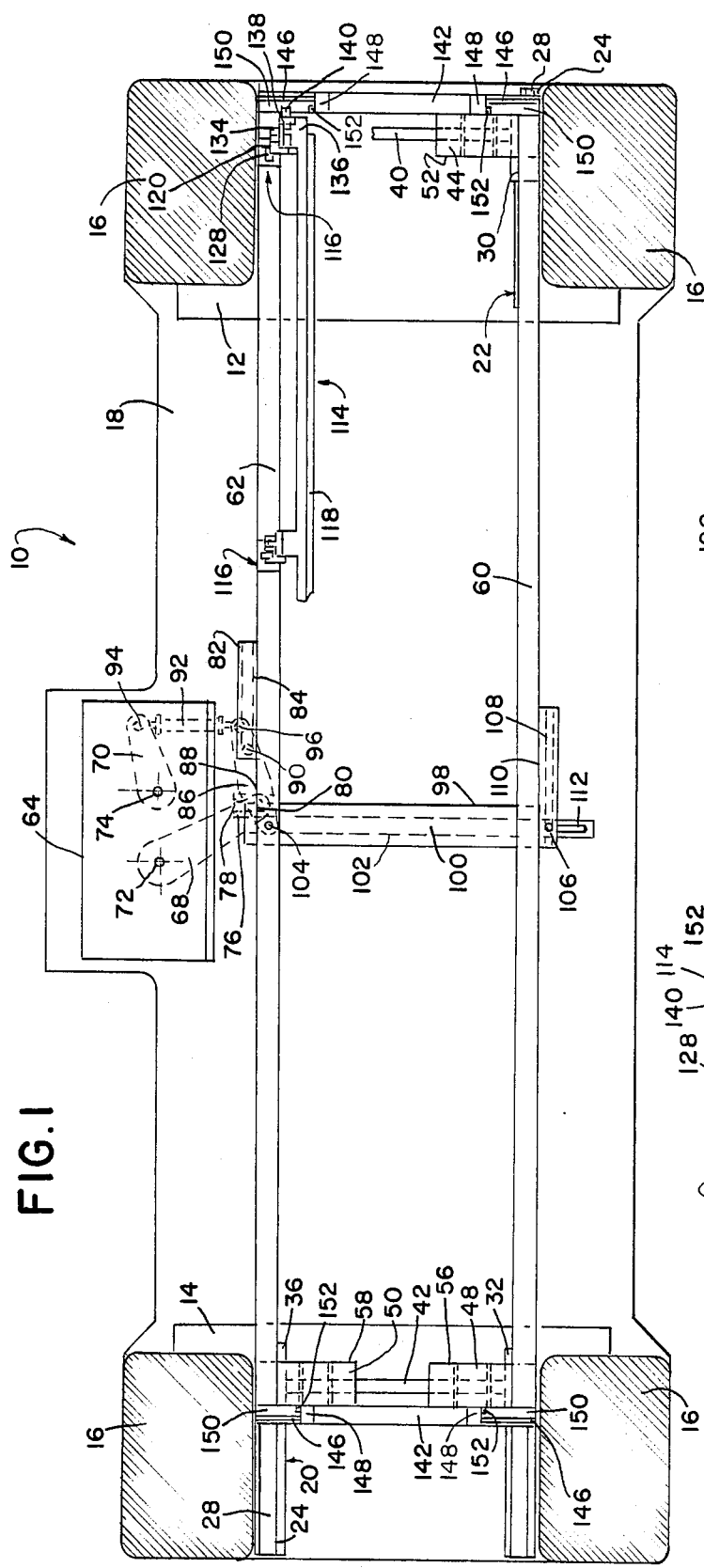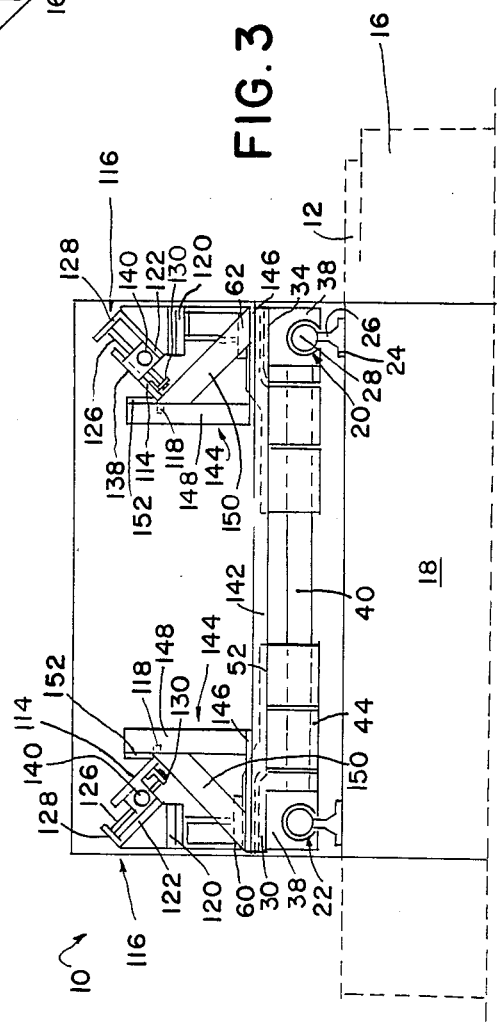

4,577,748

PRESS MOUNTED TRANSFER APPARATUS

BACKGROUND OF THE INVENTION

The present invention relates generally to a transfer apparatus for transferring work pieces from station to station in a multiple station press and more particularly has reference to a relatively inexpensive three axis transfer which can be mounted on standard press equipment.

A related transfer apparatus is disclosed in co-pending application Ser. No. 355,068, filed Mar. 5, 1982 now abandoned. The apparatus disclosed therein is designed to be mounted a standard press equipment. However, the apparatus is only a two axis system which uses relatively complex means for coordinating transverse movement of the transfer bars. There is no means for providing vertical movement.

A need thus exists for a relatively inexpensive and non-complex transfer apparatus which can be easily mounted on standard press equipment and which is capable of longitudinal, transverse and vertical motions.

SUMMARY OF THE INVENTION

The present invention fulfills the above need.

In the transfer apparatus of the present invention, longitudinally spaced-apart mounting plates are mounted on the press bed and support the ends of a pair of parallel longitudinal rails. Two slide assemblies are mounted on each rail, one slide assembly being adjacent each end of the rail. Two longitudinally spaced parallel transverse rails have opposite ends mounted in transversely opposite slide assemblies. Two slide assemblies are mounted on each of the transverse rails, one slide assembly being adjacent each end of the transverse rails. A pair of parallel longitudinal transfer bars have ends mounted on the transverse slide assemblies.

A drive box adjacent the longitudinal rails has a longitudinal drive lever and a transverse drive lever.

The longitudinal drive lever has a roller on a distal end which is received in a transverse channel mounted on the transfer bar adjacent the drive box. Pivotal movement of the longitudinal drive lever urges the roller against the sides of the channel to impart longitudinal movement to the transfer bar. Longitudinal movement of the transfer bar causes the longitudinal slide assemblies to move along the longitudinal rails, thereby causing simultaneous longitudinal movement of both transfer bars.

The transverse drive lever has a distal end pivotally connected to one end of a link. The other end of the link is pivotally connected to a crank arm next to the transfer bar adjacent the drive box. The crank arm has a central pivot. A roller mounted on the crank arm on one side of the pivot slides in a longitudinal channel mounted on the transfer bar adjacent the drive box. An end of the crank arm on an opposite side of the pivot is connected to one end of a slidable transverse rod. The opposite end of the slidable rod is provided with a roller which is mounted in a longitudinal channel connected to the transfer bar remote from the drive box. Pivotal movement of the transverse drive lever pivots the crank arm, causing the rollers in the longitudinal slots to move toward or away from each other. The rollers act on the walls of the longitudinal channels to cause coordinated transverse movement of the transfer bars.

Linear bearing assemblies mounted on the transfer bars slant upwardly and outwardly with respect to the bars. Carriages slidable along the bearing assemblies support a pair of parallel longitudinal bars which mount the transfer grippers or fingers. Rollers on the carriages abut stationary posts upon inward transverse movement of the transfer bars to cause the carriages to slide upwardly along the bearing assemblies, thereby moving the grippers or fingers in the vertical direction.

Objects of the invention are, therefore, to provide an improved transfer apparatus and to provide a relatively inexpensive and non-complex three axis transfer apparatus which can be mounted on standard press equipment.

Another object of the invention is to provide transfer apparatus wherein the transverse motions of the transfer bars are coordinated by a slidable rod connected to the transverse drive system and one of the transfer bars.

Yet another object of the invention is to provide transfer apparatus wherein the transverse drive system includes a pivotal crank arm connected to rollers received in longitudinal channels mounted on the transfer bars.

Yet another object of the invention is to provide transfer apparatus wherein the vertical drive system is automatically actuated upon transverse movement of the transfer bars.

Still another object of the invention is to provide a three axis transfer apparatus requiring only two drive elements or systems to actuate the three motions.

Still another object of the invention is to provide transfer apparatus having a base for mounting on a press bed, longitudinal rail means attached to the base for supporting the transfer apparatus on the base, longitudinal slide means mounted on the longitudinal rail means for moving forward and rearward in longitudinal directions with respect to the base, transverse rail means mounted on the longitudinal slide means, transverse slide means mounted on the transverse rail means for moving transversely in and out on the transverse rail means with respect to the base, first and second longitudinal transfer bars connected to the transverse slide means for moving transversely with the transverse slide means, longitudinal drive means connected to one of the transfer bars for driving the transfer bars longitudinally forward and rearward, transverse drive means connected to the first transfer bar for driving the transfer bar transversely in and out, and a transverse rod having a first end connected to the transverse drive means and a second end connected to the second transfer bar for imparting coordinated transverse in and out movement to the second transfer bar.

Yet another object of the invention is to provide transfer apparatus having a base for mounting on a press bed, longitudinal rail means attached to the base for supporting the transfer apparatus on the base, longitudinal slide means mounted on the longitudinal rail means for moving forward and rearward in longitudinal directions with respect to the base, transverse rail means mounted on the longitudinal slide means, transverse slide means mounted on the transverse rail means for moving transversely in and out on the transverse rail means with respect to the base, first and second longitudinal transfer bars connected to the transverse slide means for moving transversely with the transverse slide means, longitudinal drive means connected to the transfer bars for driving the transfer bars longitudinally forward and rearward, transverse drive means connected to the transfer bars for driving the transfer bars transversely in and out, mounting means connected to the transfer bars for supporting slide assembly means slanting outwardly and away from the transfer bars, slide assembly means mounted on the mounting means having slidable carriage means moveable therealong, roller means mounted on the carriage means, bumper means mounted on the longitudinal slide means aligned with and transversely inwardly spaced from the roller means, the roller means abutting the bumper means upon inward transverse movement of the transfer bars, continued inward transverse movement of the transfer bars resulting in the bumper means urging the roller means transversely outward causing the carriage means to slide outwardly along the slide assembly means and move vertically away from the transfer bars.

These and other and further objects and features of the invention are apparent in the disclosure which includes the above and below specification and claims and drawings.

BRIEF DESCRIPTION OF THE DRAWINGS

FIG. 1 is a simplified plan view, partly in section, of the transfer apparatus of the present invention mounted on a press.

FIG. 3 is an end elevation of the apparatus shown in FIG. 1.

DETAILED DESCRIPTION OF THE DRAWINGS

Figure 2:
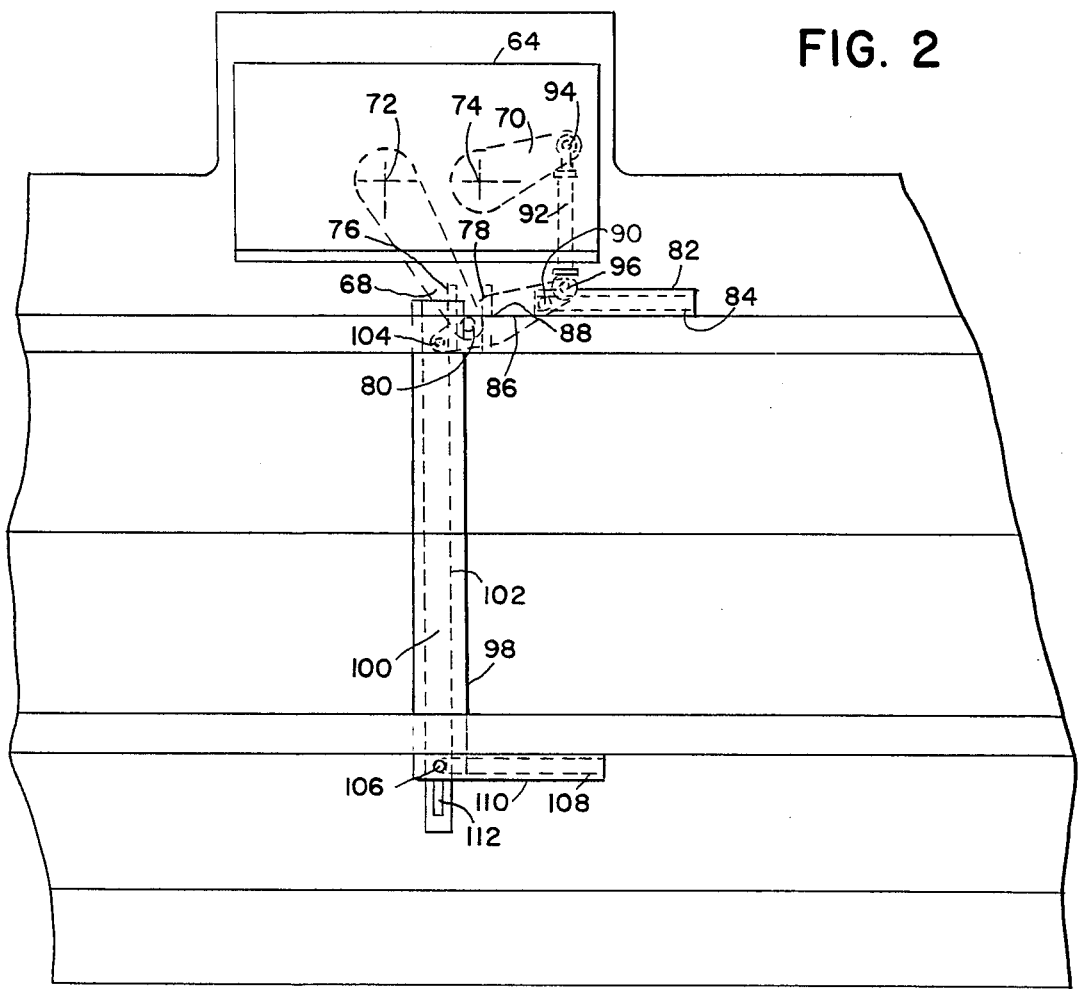
FIG. 2 is a plan detail of the longitudinal and transverse drives shown in FIG. 1.

Referring to FIGS. 1 and 3, a transfer apparatus embodying features of the present invention is indicated generally by the numeral 10. The general function of the transfer 10 is to transfer work pieces from station-to-station in a standard multiple station press. The structure of the press is well known and forms no part of the present invention.

The transfer apparatus 10 has two longitudinally spaced base plates 12 and 14 which are constructed with the transfer 10 for mounting between the posts 16 at the corners of a press bed 18. The plates 12 and 14 support the ends of a pair of spaced parallel longitudinal guide rails 20 and 22. Each rail 20 and 22 has a base 24 connected to its respective mounting plate 12 and 14 and a web 26 extending upwardly therefrom to support a rail 28 of circular cross-section.

One pair of slides 30 and 32 is mounting between one of the guide rails 22 adjacent the ends thereof and a second pair of slides 34 and 36 is mounted on the other guide rail 20 adjacent the ends thereof. Each slide 30, 32, 34, and 36 houses a recirculating ball-type linear bearing assembly 38 which receives the rails 28 to permit the slides 30, 32, 34, and 36 to freely slide along their respective guide rails 22 and 24.

A pair of spaced parallel transverse guide rails 40 and 42 have ends mounted in transversely opposite slides 30 and 34 and 32 and 36 respectively. In preferred form, the transverse guide rails 40 and 42 are cylindrical rods.

Transversely spaced pairs of slides 44 and 46 are mounted on one of the transverse guide rails 40 adjacent the ends thereof and similar pairs of slides 48 and 50 are mounted on the other transverse guide rail 42 adjacent the ends thereof. The slides 44, 46, 48 and 50 house recirculating ball-type linear bearing assemblies which receive the transverse rails 40 and 42 to permit the slides 44, 46, 48 and 50 to slide freely along the rails 40 and 42.

A mounting plate 52, 54, 56 and 58 is mounted on each of the pairs of transverse slides 44, 46, 48 and 50. The plates 52, 54, 56 and 58 have inner portions which extend across the upper surfaces of the slides 44, 46, 48 and 50 and outer portions which extend across the upper surfaces of the longitudinal slides 30, 32, 34 and 36. The ends of a pair of spaced parallel longitudinal transfer bars 60 and 62 are mounted on the outer portions of the mounting plates 52, 54, 56 and 58.

It will be appreciated that longitudinal movement of the transfer bars 60 and 62 is accomplished by sliding the longitudinal slides 30, 32, 34 and 36 along the longitudinal rails 20 and 22 and that transverse movement of the transfer bars 60 and 62 is accomplished by sliding the transverse slides 44, 46, 48 and 50 along the transverse rails 40 and 42. The transverse rails 40 and 42 keep their respective longitudinal slides 30 and 34 and 32 and 36 respectively in alignment during longitudinal movement to insure that both transfer bars 60 and 62 experience identical longitudinal movement. Means for coordinating transverse movement of the transfer bars 60 and 62 will be described later.

Referring to FIG. 2, a drive box 64 is mounted on the press bed 18 adjacent one of the transfer bars 62. The box 64 houses means for driving a pair of lever arms 68 and 70 pivotally mounted on a lower surface of the box 64. In the preferred embodiment, the drive box 64 is a cam box which is driven by a toothed pulley or a gear which is in turn driven by the press drive. Cams are provided within the box to move the levers 68 and 70 back and forth around their respective pivots 72 and 74. It is understood, however, that other types of drive systems could be housed within the drive box 64.

A downwardly opening transverse channel member 76 with a bearing surface 78 is mounted on the underside of the transfer bar 62 adjacent the drive box 64. A roller 80 mounted on the distal end of one of the levers 68 rolls in the channel 76 as the lever 68 is oscillated back and forth about its pivot 72 to drive the transfer bar 62 left and right, as shown in the drawing, or forward and rearward along the longitudinal transfer path on the press bed 18.

A downwardly opening longitudinal channel member 82 with a bearing surface 84 is mounted on the transfer bar 62 adjacent the drive box 64. A crank arm 86 moveable back and forth about a pivot 88 supports a roller 90 which is received within the channel member 82. One end of a link 92 has a pivot connection 94 to the distal end of the other lever 70 and the other end of the link 92 has a pivot connection 96 to an end of the crank arm 86. When the lever 70 is oscillated about its pivot 74, the link 92 drives the crank arm 86 back and forth about its pivot 88. The roller 90 rolls in the channel 82 as the crank arm 86 is oscillated to drive the transfer bar 62 up and down, as shown in the drawing, or inward and outward transverse to the transfer path on the press bed 18.

A slide bracket 98 extends transversely across the transfer path beneath the transfer bars 60 and 62. A slide rod 100 is received in a slot 102 in the slide bracket 98. One end of the slide 100 has a pivot connection 104 to the crank arm 86. The pivot connection 104 and the roller 90 supported by the crank arm 86 are on opposite sides of the crank arm pivot 88. The other end of the slide 100 supports a roller 106 which rolls along the bearing surface 108 of a downwardly opening longitudinal channel member 110 mounted on the transfer bar 60 remote from the drive box 64. The roller 106 is mounted atop a vertical post (not shown) which extends upwardly from the slide 100 toward the channel member 110 and which is supported by a truss 112 extending diagonally between the upper end of the post and the outer end of the slide 100. Oscillatory movement of the crank arm 86 about its pivot 88 causes the slide 100 to move transversely back and forth across the transfer path, pulling the transfer bar 60 inward and pushing the bar 60 outward. The rollers 90 and 106 move inwardly and outwardly together, thereby insuring coordinated transverse movement of the transfer bars 60 and 62.

Figure 7:
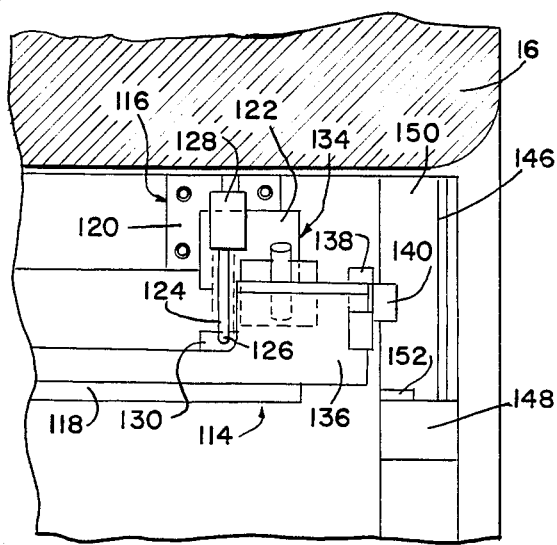
FIG. 7 is a plan detail of the vertical motion assembly shown in FIG. 1.

Referring again to FIG. 1, it can be seen that a longitudinal support bar 114 extends parallel to the transfer bar 62 adjacent the drive box 64 and is mounted thereon by a plurality of longitudinally spaced vertical motion assemblies 116, as shown in detail in FIG. 7. The vertical motion assemblies in 116 allow the support bar 114 to move vertically with respect to the transfer bar 62 in a manner more fully described later. The support bar 114 has a finger-mounting flange 118 along its inward edge. Conventional transfer fingers or grippers (not shown) are mounted on the flange 118 at desired locations to grip articles in press stations and to transfer the articles from station to station.

A similar support bar and plurality of vertical motion assemblies are mounted on the transfer bar 60 remote from the drive box 64. For simplicity, these elements have been omitted from the figures. It will be understood, however, that they are structurally and functionally identical to the corresponding elements 114 and 116 mounted on the transfer bar 62 adjacent the drive box 64.

Figure 6:
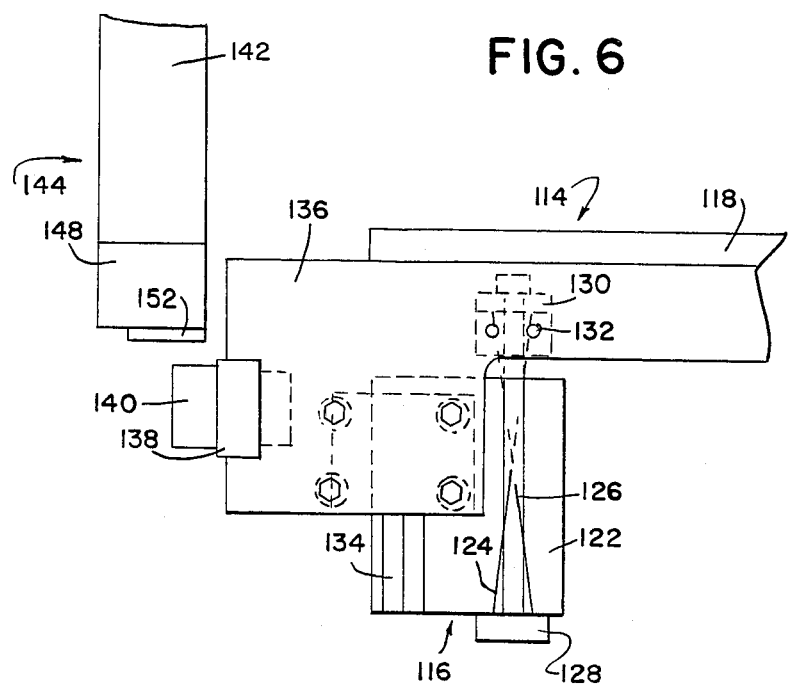
FIG. 6 is a fragmentary plan detail of the vertical motion assembly shown in FIGS. 1 and 3-5.

The vertical motion assemblies 116 are best understood by reference to FIGS. 3 and 6. Although these figures only show the assembly 116 at the end of the support bar 114, it is understood that the other assemblies along the length of the support bar 114 are similar and require no additional explanation.

Vertical mounting pedestals 120 extend upwardly from the transfer bar 62 and support base plates 122 which slant upwardly and outwardly with respect to the transfer bar 62. Compression springs 124 concentrically disposed about support shafts 126 extend between end plates 128 extending upwardly from the outward ends of the base plates 122 and L-brackets 130 connected to the underside of the support bar 114 by screws 132. The spring 124 biases the support bar 114 inwardly. Linear bearing assemblies 134 extending parallel to the compression springs 124 connect the base plates 122 to enlarged portions 136 of the support bar 114 to allow the support bar 114 to act as a carriage sliding back and forth across the base plates 122.

Roller mounting plates 138 extend downwardly from the enlarged portions 136 at the ends of the support bar 114. Rollers 140 are mounted on the plates 138 and extend longitudinally outwardly from the ends of the support bar 114.

Lateral support beams 142 are mounted on the longitudinal slide means 12 and 14 and extend between the posts 16 of the press bed 18 longitudinally outwardly of the ends of the support bars 114. Bumper assemblies 144 are mounted on the support beams 142 adjacent each of the bed posts 16. Each bumper assembly 144 has a base 146 mounted on the support beam 142 and a post 148 upstanding from the base 146 and positioned inwardly of the adjacent support bar 114. A reinforcement truss 150 extends diagonally between the upper end of the post 148 and the outward end of the base 146. Pads 152 are mounted on the outwardly facing surfaces of the posts 148 in alignment with the rollers 140 in the adjacent vertical motion assemblies 116.

Figure 4:
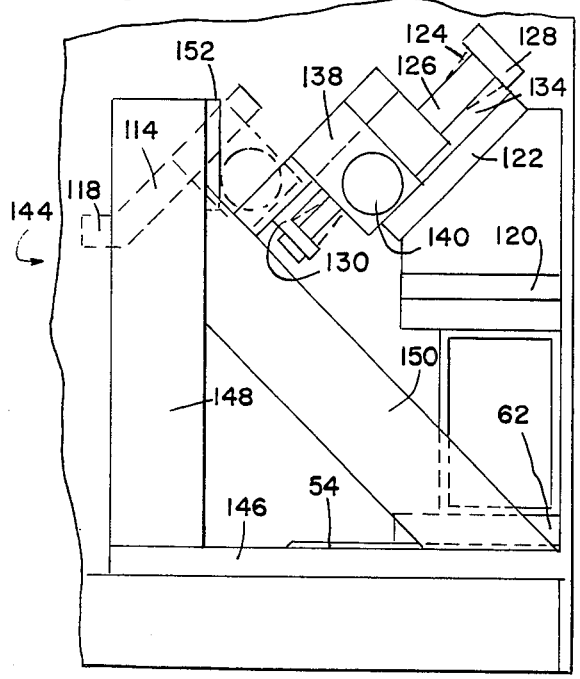
FIG. 4 is an elevational detail showing the vertical motion assembly of FIG. 3 in one operative position.
Figure 5:
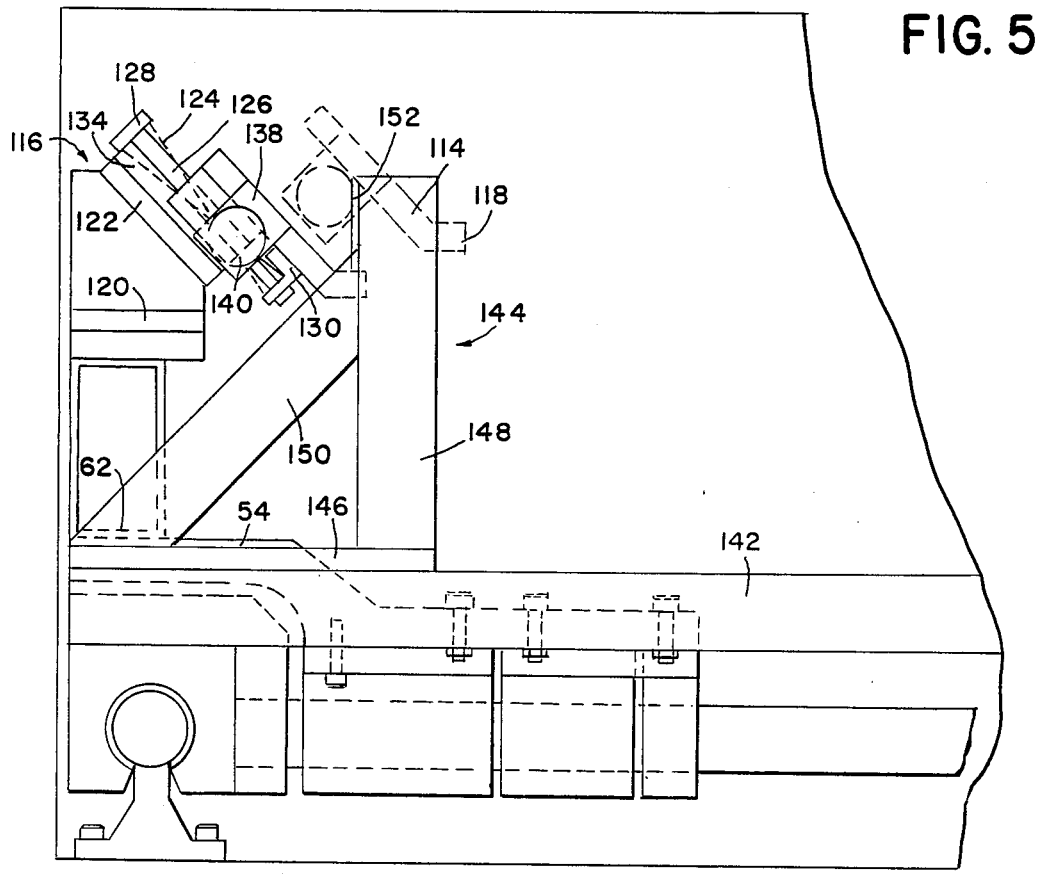
FIG. 5 is an elevational detail showing the vertical motion assembly in another operative position.

Operation of the vertical motion assemblies 116 can best be understood by reference to FIGS. 4 and 5.

When the transfer bars are moved inwardly in the manner described above, the rollers 140 approach the pads 152. Continued inward movement of the transfer bars brings the rollers 140 into abutment with the pads 152, as shown in FIG. 4. This is referred to as the clamped position, the support bars 114 being clamped against further inward movement. It will be recognized that the support bars 114 have undergone no vertical movement between the initial position and the clamped position.

Continued inward movement of the transfer bars forces the enlarged portions 136 of the support bars 114 to slide upwardly along the base plates 122 in opposition to the bias of the compression springs 124. The rollers 140 roll upwardly along the pads 152 toward the tops of the posts 148, as shown in FIG. 5. This is referred to as the clamped and lifted position, it being readily recognized that the support bars 114 have been moved vertically upwardly relative to the transfer path.

Outward motion of the transfer bars lowers the support bars 114 and returns the vertical motion assemblies 116 to the clamped position under the urging of the compression springs 124. Continued outward movement of the transfer bars moves the support bars 114 outwardly to the initial position.

It will be recognized that the vertical motion assemblies 116 automatically impart vertical motion to the support bars 114 upon transverse movement of the transfer bars. Hence, vertical motion is achieved without the need for a third source of driving power in the drive box 64 or elsewhere.

While the invention has been described with reference to a specific embodiment, the exact nature and scope of the invention is defined in the following claims.

We claim:

1. Transfer apparatus comprising a base for mounting on a press bed, longitudinal rail means attached to the base for supporting the transfer apparatus on the base, longitudinal slide means mounted on the longitudinal rail means for moving forward and rearward in longitudinal directions with respect to the base, transverse rail means mounted on the longitudinal slide means, transverse slide means mounted on the transverse rail means for moving transversely in and out on the transverse rail means with respect to the base, first and second longitudinal transfer bars connected to the transverse slide means for moving transversely with the transverse slide means, longitudinal drive means connected to one of the transfer bars for driving the transfer bars longitudinally forward and rearward, transverse drive means connected to the first transfer bar for driving the transfer bar transversely in and out, and a transverse rod having a first end connected to the transverse drive means and a second end connected to the second transfer bar for imparting coordinated transverse in and out movement to the second transfer bar.

2. The apparatus of claim 1 wherein the transverse rod is slidably mounted in a transverse bracket.

3. The apparatus of claim 1 wherein the second end of the transverse rod is provided with roller means which is received in longitudinal channel means connected to the second transfer bar.

4. The apparatus of claim 1 wherein the longitudinal drive means comprises a drive box, a longitudinal drive arm pivotally mounted on the box, roller means mounted on a distal end of the longitudinal drive arm, and transverse slot means mounted on said one transfer bar, the roller means extending into the slot means for moving transversely in the slot means and for driving the slot means and said one transfer bar longitudinally in response to movements of the longitudinal drive arm.

5. The apparatus of claim 1 wherein the transverse drive means comprises a drive box, a transverse drive arm pivotally mounted on the drive box, link means having a first end pivotally connected to a distal end of the transverse drive arm and a second end pivotally connected to a crank arm, the crank arm being provided with first and second pivot connection means connected to the first transfer bar and the transverse rod respectively located on opposite sides of means for pivotally mounting said crank arm.

6. The apparatus of claim 5 wherein the first pivot connection means comprises roller which is received in longitudinal channel means connected to the first transfer bar.

7. The apparatus of claim 1 wherein the longitudinal rail means comprise first and second spaced longitudinal rails mounted parallel to each other on opposite sides of the base.

8. The apparatus of claim 7 wherein each of the first and second rails comprise longitudinally spaced first and second sections.

9. The apparatus of claim 8 wherein the longitudinal slide means comprise four longitudinal slide assemblies, each slide assembly being mounted on a respective rail section.

10. The apparatus of claim 9 wherein the transverse rail means comprise two longitudinally spaced parallel transverse rails each having opposite ends mounted in transversely opposite slide assembies.

11. The apparatus of claim 10 wherein the transverse slide means comprise four transverse slide assemblies, two of which are mounted on each transverse rail.

12. The apparatus of claim 11 wherein the first transfer bar is connected at opposite ends to transverse slide assemblies mounted near ends of the transverse rails adjacent one side of the base and the second transfer bar is connected at opposite ends to transverse slide assemblies mounted near opposite ends of the transverse rails adjacent an opposite side of the base.

13. The apparatus of claim 1 further comprising means mounted on the transfer bars for vertical movement with respect thereto.

14. The apparatus of claim 13 further comprising means for actuating said vertical movement means upon transverse movement of said transfer bars.

15. Transfer apparatus comprising a base for mounting on a press bed, longitudinal rail means attached to the base for supporting the transfer apparatus on the base, longitudinal slide means mounted on the longitudinal rail means for moving forward and rearward in longitudinal directions with respect to the base, transverse rail means mounted on the longitudinal slide means, transverse slide means mounted on the transverse rail means for moving transversely in and out on the transverse rail means with respect to the base, first and second longitudinal transfer bars connected to the transverse slide means for moving transversely with the transverse slide means, longitudinal drive means connected to one of the transfer bars for driving the transfer bars longitudinally forward and rearward, transverse drive means connected to the first transfer bar for driving the transfer bar transversely in and out and a transverse rod having a first end connected to the transverse drive means and a second end connected to the second transfer bar for imparting coordinated transverse in and out movement to the second transfer bar, means mounted on the transfer bars for vertical movement with respect thereto, means for actuating said vertical movement means upon transverse movement of said transfer bars, wherein the vertical movement means comprises mounting means connected to the transfer bars for supporting slide assembly means slanting outwardly and away from the transfer bars, slide assembly means mounted on the mounting means having slidable carriage means moveable therealong, and roller means mounted on the carriage means, and the acting means comprises bumper means mounted on the longitudinal slide means aligned with the transversely inwardly spaced from the roller means, the roller means abutting the bumper means upon inward transverse movement of the transfer bars, continued inward transverse movement of the transfer bars urging the carriage means to slide outwardly along the slide assembly means and move vertically away from the transfer bars.

16. Transfer apparatus comprising a base for mounting on a press bed, longitudinal rail means attached to the base for supporting the transfer apparatus on the base, longitudinal slide means mounted on the longitudinal rail means for moving forward and rearward in longitudinal directions with respect to the base, transverse rail means mounted on the longitudinal slide means, transverse slide means mounted on the transverse rail means for moving transversely in and out on the transverse rail means with respect to the base, first and second longitudinal transfer bars connected to the transverse slide means for moving transversely with the transverse slide means, longitudinal drive means connected to the transfer bars for driving the transfer bars longitudinally forward and rearward, transverse drive means connected to the transfer bars for driving the transfer bars transversely in and out, mounting means connected to the transfer bars for supporting slide assembly means slanting outwardly and away from the transfer bars, slide assembly means mounted on the mounting means having slidable carriage means moveable therealong, roller means mounted on the carriage means, bumper means mounted on the longitudinal slide means aligned with and transversely inwardly spaced from the roller means, the roller means abutting the bumper means upon inward transverse movement of the transfer bars, continued inward transverse movement of the transfer bars urging the carriage means to slide outwardly along the slide assembly means and move vertically away from the transfer bars.

17. The apparatus of claims 15 or 16 wherein the slide assembly means further comprises spring means for biasing the carriage means inwardly.

18. The apparatus of claims 15 or 16 further comprising longitudinal support bar means connected to the carriage means and being moveable therewith for supporting transfer gripper means.

19. The apparatus of claims 15 or 16 wherein the bumper means comprises vertical post means upstanding from the longitudinal slide means adjacent ends of the transfer bars.

20. Transfer apparatus comprising transverse rail means, transverse slide means mounted on the transverse rail means for moving transversely in and out on the transverse rail means, first and second longitudinal transfer bars connected to the transverse slide means for moving transversely with the transverse slide means, transverse drive means connected to the transfer bars for driving the transfer bars transversely in and out, mounting means connected to the transfer bars for supporting slide assembly means slanting outwardly and away from the transfer bars, slide assembly means mounted on the mounting means having slidable carriage means moveable therealong, roller means mounted on the carriage means, bumper means aligned with and transversely inwardly spaced from the roller means, the roller means abutting the bumper means upon inward transverse movement of the transfer bars, continued inward transverse movement of the transfer bars urging the carriage means to slide outwardly along the slide assembly means and move vertically away from the transfer bars.

21. The apparatus of claim 20 wherein the slide assembly means further comprises spring means for biasing the carriage means inwardly.

22. The apparatus of claim 20 wherein further comprising longitudinal support bar means connected to the carriage means and being moveable therewith for supporting transfer gripper means.

23. The apparatus of claim 20 wherein the bumper means comprises vertical post means upstanding adjacent ends of the transfer bars.

* * * * *

UNITED STATES PATENT AND TRADEMARK OFFICE
CERTIFICATE OF CORRECTION

PATENT NO. : 4,577,748

DATED : March 25, 1986

INVENTOR(S) : Gregory J. Boegner et al

It is certified that error appears in the above-identified patent and that said Letters Patent is hereby corrected as shown below:

Column 7, line 27, after "roller" insert -- means --.

Column 8, line 25, "the" should read -- and --.

Signed and Sealed this

Eighth Day of July 1986

[SEAL]

Attest:

DONALD J. QUIGG

Attesting Officer

Commissioner of Patents and Trademarks